US011578893B2

(12) United States Patent
Couapel et al.

(10) Patent No.: US 11,578,893 B2
(45) Date of Patent: Feb. 14, 2023

(54) ELECTRICAL HEATING DEVICE COMPRISING EARTHING MEANS

(71) Applicant: Valeo Systemes Thermiques, Le Mesnil-Saint-Denis (FR)

(72) Inventors: Yann Couapel, Le Mesnil Saint Denis (FR); Erwan Gogmos, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 298 days.

(21) Appl. No.: 16/765,642

(22) PCT Filed: Dec. 10, 2018

(86) PCT No.: PCT/FR2018/053173
§ 371 (c)(1),
(2) Date: May 20, 2020

(87) PCT Pub. No.: WO2019/122583
PCT Pub. Date: Jun. 27, 2019

(65) Prior Publication Data
US 2020/0309409 A1  Oct. 1, 2020

(30) Foreign Application Priority Data
Dec. 19, 2017 (FR) ...................... 1762539

(51) Int. Cl.
*F24H 3/04* (2022.01)
*H05B 3/44* (2006.01)
(Continued)

(52) U.S. Cl.
CPC ....... *F24H 3/0441* (2013.01); *B60H 1/00328* (2013.01); *F24H 3/0435* (2013.01);
(Continued)

(58) Field of Classification Search
CPC .... F24H 3/0441; F24H 3/0435; F24H 3/0447; F24H 3/0452; H05B 3/44; H05B 1/0236; H05B 2203/023; B60H 1/00328
See application file for complete search history.

(56) References Cited

U.S. PATENT DOCUMENTS 8,395,089 B2 * 3/2013 Bohlender ............ F24H 3/0429
219/202

FOREIGN PATENT DOCUMENTS

CN       201368530 Y    12/2009
DE    102009033987 A1    1/2011
(Continued)

OTHER PUBLICATIONS

International Search Report and Written Opinion in corresponding International Application No. PCT/FR2018/053173, dated Apr. 1, 2019 (11 pages).

(Continued)

*Primary Examiner* — Geoffrey S Evans
(74) *Attorney, Agent, or Firm* — Osha Bergman Watanabe & Burton LLP

(57) ABSTRACT

The invention relates to a heating device (1) for an air-conditioning housing, said heating device (1) comprising a heating body (2) supplied with current for heating an air flow passing through said heating body (2), said heating body (2) comprising heating elements through which said current passes and which are arranged in electrically insulated tubes (4) of the heating elements, said heating elements being controlled via a distribution unit (3), said heating device (1) comprising means for earthing a plurality of metal elements distributed in the heating body (2) and the distribution unit (3). Said heating device (1) is characterised in that said earthing means consist of a single earthing circuit which passes through the heating body (2) and the distribution unit (Continued)

(3) and is formed by arranging said metal elements in series with direct contact between said metal elements.

14 Claims, 3 Drawing Sheets

(51) Int. Cl.
*B60H 1/00* (2006.01)
*H05B 1/02* (2006.01)
(52) U.S. Cl.
CPC ......... *F24H 3/0447* (2013.01); *F24H 3/0452* (2013.01); *H05B 1/0236* (2013.01); *H05B 3/44* (2013.01)

(56) References Cited

FOREIGN PATENT DOCUMENTS

EP         2299200 A1    3/2011
WO    2005050101 A2    6/2005

OTHER PUBLICATIONS

The Second Office Action issued in corresponding Chinese Application No. 201880081038.2, dated Sep. 7, 2021 (11 pages).

\* cited by examiner

ELECTRICAL HEATING DEVICE COMPRISING EARTHING MEANS

FIELD OF THE INVENTION

The invention relates to a heating device for an air-conditioning housing, comprising earthing means. The invention also relates to an air-conditioning housing comprising such a heating device. It is particularly applicable in the field of motor vehicles.

PRIOR ART

Electrical heating devices are known that are intended to be integrated into vehicle air-conditioning housings. This involves either additional radiators, combined with heating radiators traversed by a heat transfer fluid, in heat engine vehicles, or main radiators in electric or hybrid vehicles.

Such heating devices comprise a heating body accommodating heating units provided with heating elements supplied with electric current by electrodes. For electrical safety reasons, the heating elements and their power supply electrodes may need to be insulated from the outside. To this end, the heating units comprise tubes, with the heating elements and their electrode being located therein, the inner surface of the tube being provided with an electrically insulating layer for insulating the heating elements and their electrode.

These heating devices comprise a distribution unit capable of controlling the current circulating in the heating units, in particular via an electronic board.

Several elements equally forming part of the heating body and of the distribution unit necessarily must be earthed as a safety measure.

By way of a reminder, the earth is the conductive part of electrical hardware liable to be touched by an individual, which hardware is not normally powered but which can be powered in the event of an insulation fault in the active parts of this hardware.

Thus, all the metal frames of the heating device must be earthed for safety reasons. In motor vehicles with metal bodywork, the bodywork is used as an electrical earth.

It is customary for each metal element of the heating device to be connected to a stud, which is connected to the earth, i.e. to the bodywork in the example of a motor vehicle. This particularly involves metal elements liable to be in contact with high current in the event of a current leak.

This involves an increase in the connections, often corresponding to earth cables, between each metal element and the stud. These connections to the stud are sometimes difficult to integrate due to the limited space available inside the heating device. Moreover, there is a risk of interference between these connections and others present inside the heating device.

SUMMARY OF THE INVENTION

The aim of the present invention is to overcome the different disadvantages mentioned above using a heating device allowing its metal elements to be earthed by means of simple and easy construction inside the heating body and the distribution unit, and where there is no risk of interference.

This aim is achieved by means of a heating device for an air-conditioning housing conventionally comprising a heating body supplied with current for heating an air flow traversing said heating body, the heating body comprising heating elements traversed by said current and being located in electrically insulated tubes of the heating elements, said heating elements being controlled via a distribution unit, the heating device comprising means for earthing a plurality of metal elements distributed in the heating body and the distribution unit.

This device is mainly characterized in that said earthing means comprise a single earthing circuit traversing the heating body and the distribution unit and formed by arranging said metal elements in series through direct contact between said metal elements.

The main idea of this invention involves providing a single earthing circuit, formed by a chain of metal earthing elements. In this chain, the metal elements directly touch in pairs, so as to provide the electrical continuity. Thus, a path of metal elements in series exists inside the heating device, forming the earthing circuit. Each metal element forms a link of the electrical chain.

Specific wiring no longer needs to be implemented when assembling the heating device, which saves a considerable amount of time.

The earthing circuit is thus simplified, especially since it requires fewer components, and those remaining are shorter and simpler than usual.

According to the various embodiments of the invention, which can be taken together or separately:
- the heating device comprises a metal heat dissipation plate, through which the earthing circuit passes;
- the heating device comprises an electrical connection element between the heating body and said plate;
- the tubes are electrically connected together via heat sinks that are electrically conductive, the earthing circuit successively traversing these tubes and these heat sinks;
- said electrical connection element is disposed between the plate and a tube forming part of the heating body;
- said electrical connection element is disposed between the plate and a heat sink forming part of the heating body;
- said electrical connection element is disposed between the plate and a metal flange forming part of the heating body and in contact with at least one heat sink: the metal flange can comprise an inter-heat sink plate, located between two adjacent heat sinks, or can comprise a plate located between a heat sink and a lateral side of the frame delimiting the heating body;
- said electrical connection element is disposed between the plate and any other conductive element of the heating body;
- said electrical connection element is disposed between the plate and any other conductive element electrically connected to the heating body;
- said electrical connection element comprises a clip with a flexible strip able to provide electrical continuity between said plate and the heating body;
- the clip comprises a first section able to attach to an edge of the plate and a second section with the flexible strip in abutment on the heating body;
- said plate comprises a perforated plate, with the first section of the clip comprising a free end, on which a shoulder is produced that is inserted into a perforation of the plate, providing resilient fitting of the clip in the plate;
- the second section has a V-shape with a branch connected to the first section and a free branch corresponding to said flexible strip that is able to deform by reducing the angle of the V in order to exert a constant pressure against the heating body;

said electrical connection element comprises a metal pin traversing an orifice in said plate that is provided to this end, said pin being able to provide electrical continuity between said plate and the heating body;

said electrical connection element comprises a metal part that is fixed, on the one hand, to the heating body by soldering or by any other technique providing electrical continuity between the heating body and the metal part and, on the other hand, to said plate by resilient fitting in a groove in the plate that is provided to this end;

the distribution unit comprises an electronic control board, on which heat releasing components are fixed, said plate being in contact with these components: it particularly involves transistors;

the fin type heat sinks extend from the tubes and touch between two adjacent tubes: the earthing circuit passes through these heat sinks;

said plate is connected, via a metal connection bar traversing the distribution unit, to an earthing stud disposed at the input of the distribution unit;

said connection bar is molded in the housing and forms an insert: this molding hides part of the earthing circuit and protects this part from other components disposed in the distribution unit. Indeed, the molding prevents any contact of this part of the circuit with the other components. The molding also allows any risk of detachment of the bar due to vibrations of the on-board heating device to be avoided. Advantageously, the bar forms an insert in the housing, which allows the protective housing to be stiffened. In this way, it is possible to equally combine an earthing function with a function for stiffening the protective housing, by means of a single bar. This combining of these functions also helps to make the distribution unit more compact;

said connection bar is made from an electrically conductive metal material, of the aluminum, steel, brass type;

said protective housing is made from an electrically insulating material, of the plastic type;

said bar comprises:
 a first end electrically connected to the plate;
 a central part molded in the housing;
 a second free end molded in the housing and connected to an earthing stud;

the bar extends orthogonal to the plate;

the bar extends over substantially the entire length of the electronic board and at a distance from the electronic board: this allows any contact with the components fixed on the electronic board to be avoided.

The invention also relates to an air-conditioning housing comprising a heating device as described above.

PRESENTATION OF THE FIGURES

The invention will be better understood, and other aims, details, features and advantages thereof will become more clearly apparent from the following detailed explanatory description of at least one embodiment of the invention, which is provided by way of a purely illustrative and non-limiting example, with reference to the appended schematic drawings.

DETAILED DESCRIPTION

Figure 1:
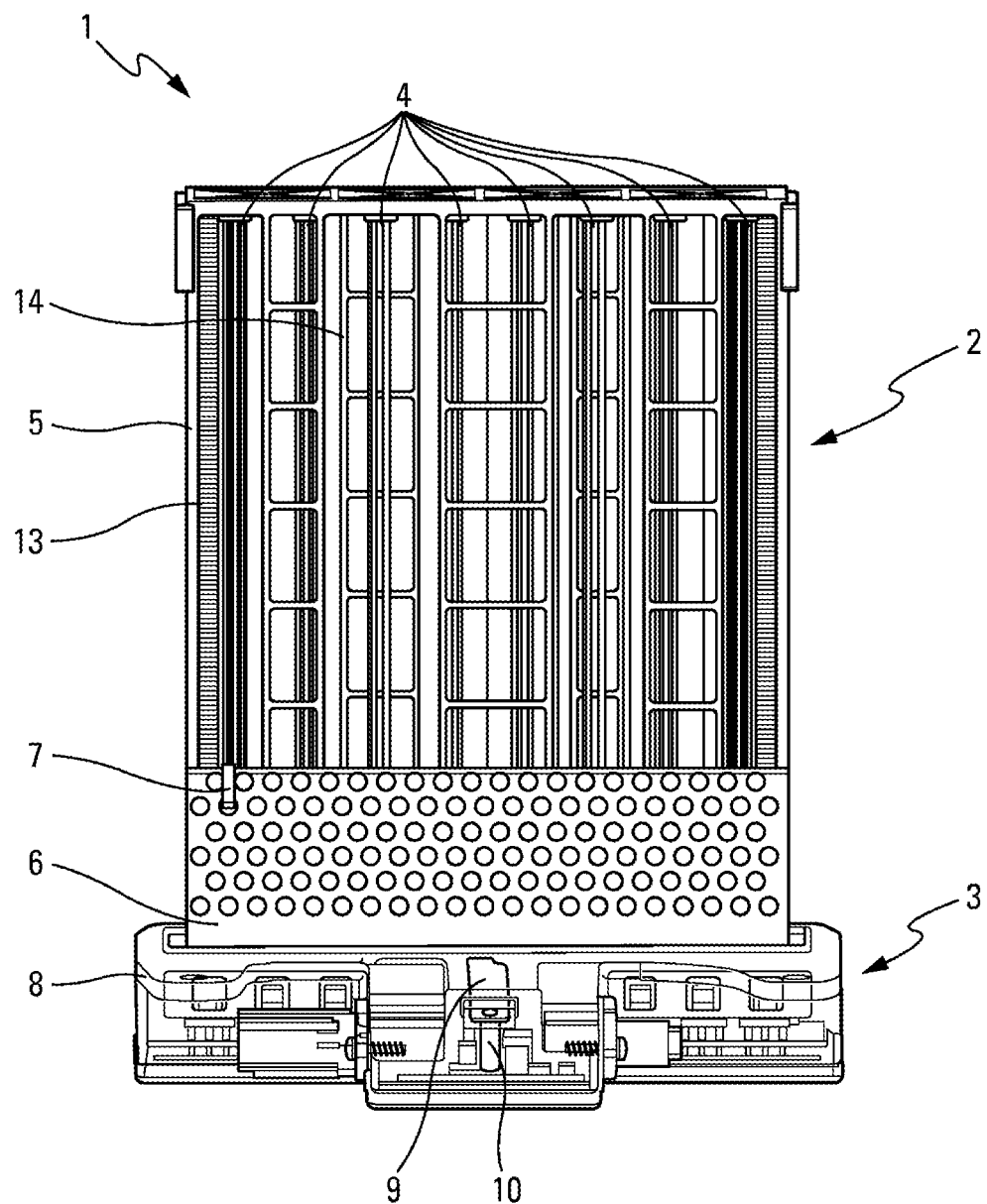
FIG. 1 shows a perspective view of a heating device according to the invention.

With reference to FIG. 1, the invention relates to an electrical heating device 1. It involves, for example, a heating device 1, called high-voltage heating device, i.e. intended to be powered by a direct (DC) or alternating (AC) current having an electrical voltage of more than 60 V, in particular between 60 and 1000 V, more specifically between 180 and 600 V, and/or allowing heating power to be released into the air, or having electrical power consumption of more than 2 kW, in particular between 2 kW and 10 kW.

Said heating device 1 comprises a heating body 2 supplied with electric current for heating an air flow traversing said heating body 2.

Said heating body 2 in this case has a substantially parallelepipedal configuration extending on the surface. It is intended to be positioned transverse to the air flow to be heated. More specifically, said air flow is intended to be oriented perpendicular to said heating body 2, i.e. perpendicular to the plane of FIG. 1.

The heating body 2 comprises heating elements (not shown) traversed by said current. The heating elements are, for example, PTC (Positive Temperature Coefficient) effect resistors.

The heating elements are located inside metal tubes 4. In order to avoid any electrical contact between the heating elements and the tubes 4, an electrically insulating and thermally conductive layer of material coats the inner surface of the tubes 4.

Each tube 4/heating elements assembly forms what is referred to as a heating unit.

Said heating units are selectively supplied with current. This is understood to mean that each heating unit is supplied with current independently of the other units and therefore can be traversed by a different current, in particular in terms of its intensity, from the currents traversing the other heating units. The value of the current that is used in this case is particularly the value of the average current or of the effective current.

The heating body 2 can comprise heat sinks 13, for example, fins, in thermal contact with the tubes 4. The heat sinks 13 are particularly positioned between said tubes 4. For the sake of clarity, only some heat sinks 13 extending from the end tubes 4 have been shown, so as not to overload FIG. 1.

Said heating body 2 comprises a frame 5, in particular made of plastic material, accommodating said heating units and being used to support said tubes 4.

Intermediate bars 14 are also provided between the tubes 4 in order to hold them in position.

Preferably, the heating device 1 further comprises a distribution unit 3 able to control the current circulating in said heating body 2.

Said distribution unit 3 is advantageously configured to control the current supplying the heating body 2, in particular the various heating units, for example, using controlled switches, allowing respective control of a circulation of current in each of the heating units. It particularly involves transistors 12, for example, of the Mosfet or IGBT type, particularly operating by pulse width modulation. These transistors 12 are particularly shown in FIG. 5 and are mounted on a T-shaped electronic board 11, therefore having a central axis of symmetry.

Figure 2:
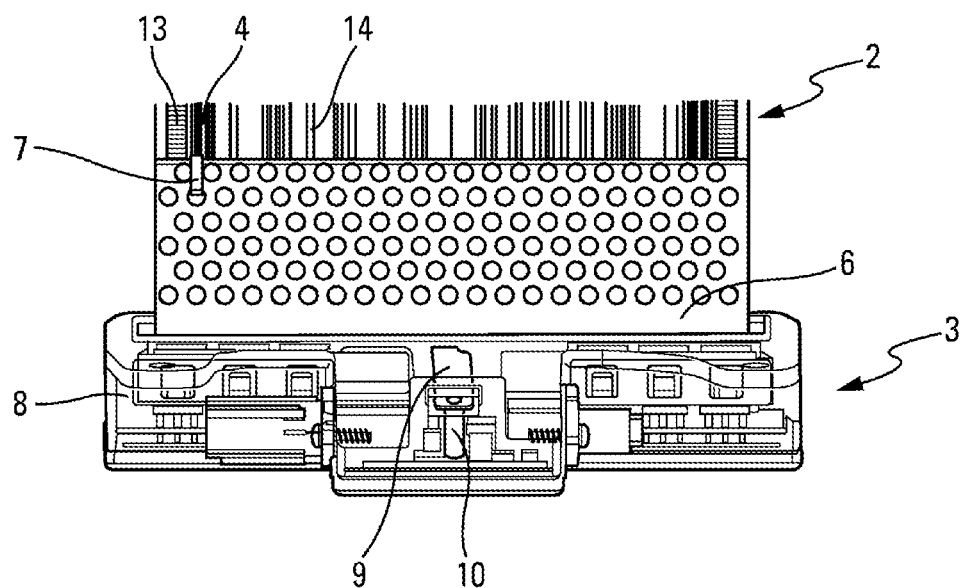
FIG. 2 is an exploded view of FIG. 1, more specifically showing the distribution unit according to the invention.

Said distribution unit 3 comprises a housing 8, shown in FIGS. 1 and 2 which completely covers said electronic board 11 and which comprises a connection face 83 used for mounting and/or mechanically fixing the heating body 2. This housing 8 is preferably made from a plastic material, having electrically insulating properties, and is obtained by molding.

When the heating elements operate, the transistors 12 release a considerable amount of heat. In order to avoid any overheating inside the housing 8, a heat dissipation plate 6 is provided in the heating device 1. This plate 6 comprises a perforated sheet, positioned in a plane parallel to the plane of the heating body 2, and located in front of the tubes 4 so that the air flow traversing the heating body 2 also traverses this perforated plate 6. Thus, this plate 6 helps to heat the air flow.

The plate 6 is mainly made up of a perforated body 63, which extends from the lugs (hidden by the transistors 12 in FIG. 5) able to come into contact with transistors 12 so as to draw the calories emanating from the transistors 12. The plate 6 thus heats up, via the transistors 12, and is subsequently cooled via the air flow.

In such a heating device 1, it is essential that the metal elements are earthed, so as to electrically safeguard them.

To this end, an earthing circuit exists that traverses the whole of the heating device 1, so that each metal element can be connected thereto. In particular, this earthing circuit is made up of a series of metal elements positioned in series and in direct contact in pairs, and thus forming the circuit.

At the heating body 2, the tubes 4, as well as the heat sinks 13 and the intermediate bars 14, are metal. In the configuration of the heating device 1 according to the invention, the heat sinks 13 are all connected to a tube 4 through direct contact, and the heat sinks 13 of two adjacent tubes 4 meet and are also in direct contact, or meet at an intermediate bar 14. Consequently, the entire row of tubes 4, of heat sinks 13 and of intermediate bars 14 are in electrical contact with each other, and the earthing circuit thus passes through all the tubes 4, the heat sinks 13 and the intermediate bars 14 of the heating body 2.

Figure 3:
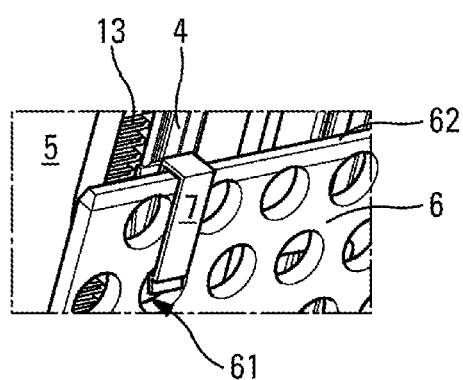
FIG. 3 shows a perspective view of an electrical connection element between a tube of the heating body and the plate of the distribution unit.
Figure 5:
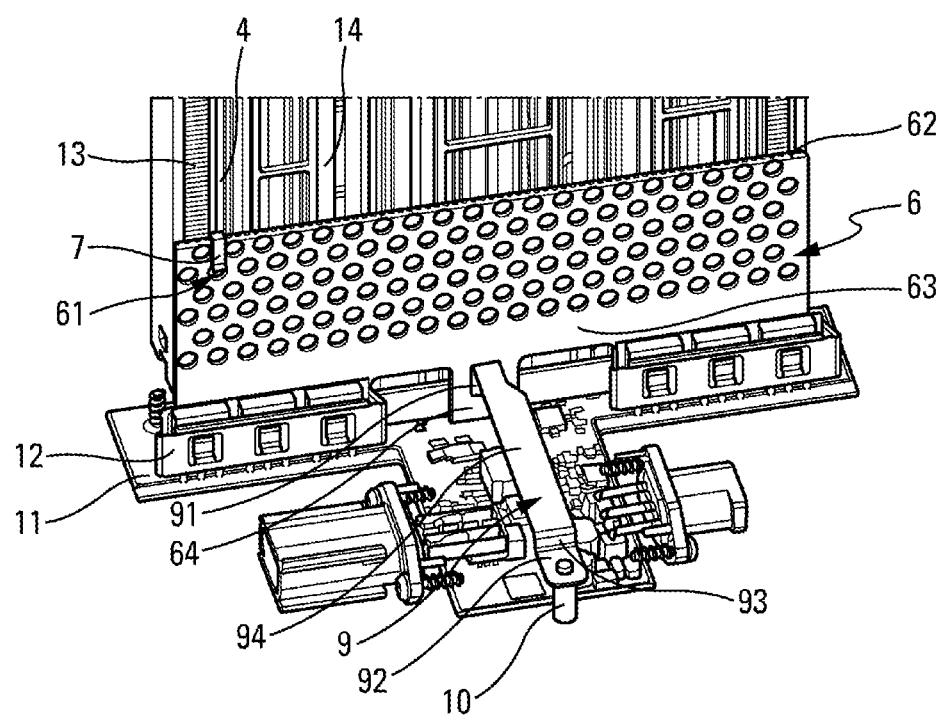
FIG. 5 shows a perspective view of an earthing bar connected to the plate.

At the output of this row of tubes 4, of heat sinks 13 and of intermediate bars 14, an electrical connection element 7 is disposed between an end tube 4 and the perforated plate 6, as is particularly shown in FIGS. 2, 3 and 5. This electrical connection element 7 provides the electrical continuity between the row of tubes 4 and the perforated plate 6.

Figure 4:
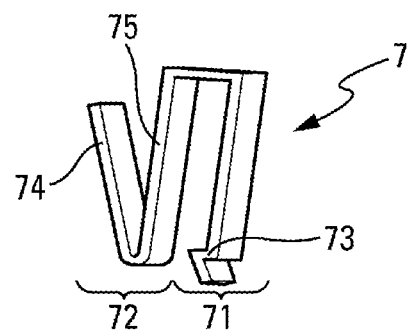
FIG. 4 is an exploded view of the electrical connection element according to FIG. 3.

With reference to FIGS. 3 and 4, which show a possible example of the invention, the electrical connection element 7 comprises a clip 7 formed by:
- a first inverted U-shaped section 71 that is positioned astride the upper edge 62 of the perforated plate 6;
- a second V-shaped section 72, a branch 75 of which is connected to the first section 71 and the free branch 74 of which comprises a flexible strip 74 coming into abutment against the outer wall of the tube 4.

More specifically, the angle of the V is designed so that the flexible strip 74 exerts sufficient pressure on the tube 4 so that the electrical contact is properly established.

The first section 71 and the second section 72 of the clip 7 comprise a shared branch 75.

The free end of the first section 71 is provided with a shoulder 73 directed toward the inside of the clip 7 and designed so as to be able to penetrate inside a perforation 61 of the perforated plate 6, so as to provide resilient fitting of the clip 7 in the plate 6.

Any other shape of the clip 7 can be contemplated. The invention is not limited to this precise shape of a clip 7. In particular, it is possible to contemplate an electrical connection element assuming the shape of a pin fixed to the plate 6 and to the tube 4 via orifices, or even a connection element comprising a part that is clipped into a groove produced in the plate 6. In general, the connection element can assume any possible shape, as long as it connects the plate 6 to the tube 4 while providing electrical continuity.

This electrical connection element is made up of a metal material.

The earthing circuit passes through this electrical connection element, then through the perforated plate 6.

The earthing circuit subsequently continues through a metal bar 9, for example, made of aluminum, steel or brass, passing above the whole of the electronic board 11 along its axis of symmetry, as is particularly shown in FIG. 5. This bar 9 orthogonally extends from the perforated plate 6.

The bar 9 comprises:
- a first end 91 fixed to the perforated plate 6;
- a central part 94 extending over the electronic board 11;
- a second free end 92 connected to an earthing stud 10.

More specifically, the first end 91 comprises a lug that is perpendicular to the central part 94. It is soldered, for example, to a central tab 64 extending from the perforated body 63 of the plate 6. It can be fixed by any other means for ensuring electrical continuity between the perforated plate 6 and the bar 9.

Even more specifically, the second end 92 comprises an orifice, into which the earthing stud 10 is bolted. The bar 9 comprises a shoulder 93 located immediately upstream of the second end 92.

The earthing circuit thus ends at the stud 10. In the case of a motor vehicle, for example, this stud 10 will be connected to the bodywork of the vehicle, which forms the earthing reference.

The earthing circuit can also follow the opposite direction, i.e. by traversing the stud, the bar, the plate, the clip, then the row of tubes/fins/intermediate bars.

Advantageously, this bar 9 is molded in the protective housing 8, as shown in FIG. 1. Such molding also allows the bar 9 to be positioned at a distance from the electronic board 11 in order to avoid any contact with the components of the board 11.

In particular, the central part 94 and the second end 92 of the bar 9 are fully embedded in the material of the protective housing 8. The first end 91 for its part is flush with the housing 8. An upper layer of plastic material and a lower layer of plastic material exist that form part of the protective housing 8 and sandwich the bar 9.

The bar 9 thus comprises an insert, which is particularly used to stiffen the housing 8. Thus, in addition to its earthing function, the bar 9 is used to consolidate the housing 8. The stud 10 projects from the protective housing 8 in order to be accessible so that it can be connected to the earth.

In this way, no particular wiring needs to be implemented inside the heating device 1 in order to earth metal elements. All the metal elements of the heating device 1 come into contact with each other, in series, so as to form a single earthing circuit traversing the heating device 1.

The invention also relates to an air-conditioning housing comprising a heating device 1 as described above. Said air-conditioning housing comprises a body for circulating the air flow, inside which body said heating device 1 is located.

With respect to the above description, the optimal dimensional relationships for the parts of the invention, including variations in size, materials, shapes, function and modes of operation, assembly and use, are considered to be clear and obvious to a person skilled in the art, and all the relationships equivalent to that which is illustrated in the drawings and to that which is described in the brief are deemed to be included in the present invention.

The invention claimed is:

1. A heating device for an air-conditioning housing, said heating device comprising:
   a heating body supplied with current for heating an air flow traversing said heating body, the heating body comprising heating elements traversed by said current and being located in electrically insulated tubes of the heating elements,
   said heating elements being controlled via a distribution unit comprising a metal heat dissipation plate; and
   an electrical connection element between the heating body and said metal heat dissipation plate;
   means for earthing a plurality of metal elements distributed in the heating body and the distribution unit,
   wherein said earthing means comprise a single earthing circuit traversing the heating body and the distribution unit and formed by arranging said metal elements in series through direct contact between said metal elements;
   wherein said electrical connection element comprises a clip with a flexible strip able to provide electrical continuity between said plate and the heating body.

2. The heating device as claimed in claim 1, wherein the earthing circuit passes through the distribution unit comprising the metal heat dissipation plate.

3. The heating device as claimed in claim 2, wherein the distribution unit comprises an electronic control board, on which heat releasing components are fixed, said plate being in contact with these components.

4. The heating device as claimed in claim 2, wherein said plate is connected, via a metal connection bar traversing the distribution unit, to an earthing stud disposed at the input of the distribution unit.

5. The heating device as claimed in claim 2, wherein the electrically insulated tubes tubes are electrically connected together via heat sinks that are electrically conductive, the earthing circuit successively traversing these tubes and these heat sinks.

6. The heating device as claimed in claim 5, wherein the fin shape heat sinks extend from the tubes and touch between two adjacent tubes.

7. The heating device as claimed in claim 1, wherein said electrical connection element is disposed between the plate and a tube, or between the plate and a heat sink, or between the plate and a metal flange in contact with at least one heat sink, or between the plate and any other conductive element of the heating body, or between the plate and any other conductive element and is electrically connected to the heating body.

8. The heating device as claimed in claim 7, wherein said electrical connection element comprises a metal pin traversing an orifice in said plate that is provided to this end, said pin being able to provide electrical continuity between said plate and the heating body.

9. The heating device as claimed in claim 7, wherein said electrical connection element comprises a metal part that is fixed to said heating body by soldering or by any other technique providing electrical continuity between the heating body and the metal part and to said plate by resilient fitting in a groove in the plate that is provided to this end.

10. The heating device as claimed in claim 1, wherein the clip comprises a first section able to attach to a first edge of the plate and a second section with the flexible strip in abutment on the heating body.

11. The heating device as claimed in claim 10, wherein said plate comprises a perforated plate, the first section of the clip comprising a free end, on which a shoulder is produced that is inserted into a perforation of the plate, providing resilient fitting of the clip in the plate.

12. The heating device as claimed in claim 11, wherein the second section has a V-shape with a branch connected to the first section and a free branch corresponding to said flexible strip able to deform by reducing the angle of the V in order to exert a constant pressure against the heating body.

13. An air-conditioning housing comprising:
    a heating device comprising:
      a heating body supplied with current for heating an air flow traversing said heating body, comprising heating elements traversed by said current and being located in electrically insulated tubes of the heating elements,
      said heating elements being controlled via a distribution unit comprising a metal heat dissipation plate; and
      an electrical connection element between the heating body and said metal heat dissipation plate;
      means for earthing a plurality of metal elements distributed in the heating body and the distribution unit,
      wherein said earthing means comprise a single earthing circuit traversing the heating body and the distribution unit and formed by arranging said metal elements in series through direct contact between said metal elements;
      wherein said electrical connection element comprises a clip with a flexible strip able to provide electrical continuity between said plate and the heating body.

14. A heating device comprising:
    a heating body supplied with current for heating an air flow traversing said heating body, comprising heating elements traversed by said current and being located in electrically insulated tubes of the heating elements,
    said heating elements being controlled via a distribution unit; and
    a single earthing circuit formed by a chain metal earthing elements distributed in the heating body and the distribution unit, wherein the metal elements directly touch in pairs, so as to provide electrical continuity inside the heating device, each metal element forming a link of the electrical chain.

* * * * *